(12) United States Patent
Marshall

(10) Patent No.: US 8,666,883 B1
(45) Date of Patent: Mar. 4, 2014

(54) TRANSACTIONS FOR PREVENTING LOAN DEFAULTS, SHORT SALES, AND FORECLOSURES

(76) Inventor: Edward Morris Marshall, Sherman Oaks, CA (US)

( * ) Notice: Subject to any disclaimer, the term of this patent is extended or adjusted under 35 U.S.C. 154(b) by 0 days.

(21) Appl. No.: 13/536,873

(22) Filed: Jun. 28, 2012

Related U.S. Application Data

(60) Provisional application No. 61/593,740, filed on Feb. 1, 2012.

(51) Int. Cl.
*G06Q 40/00* (2012.01)

(52) U.S. Cl.
USPC ............................................. 705/38; 705/35

(58) Field of Classification Search
USPC .................................................... 705/38, 35
See application file for complete search history.

(56) References Cited

U.S. PATENT DOCUMENTS

| | | | | |
|---|---|---|---|---|
| 5,983,206 | A * | 11/1999 | Oppenheimer | 705/38 |
| 2005/0097033 | A1* | 5/2005 | Pretell et al. | 705/38 |
| 2008/0189204 | A1* | 8/2008 | Hansford | 705/38 |

OTHER PUBLICATIONS

Benjamin Marrison, Plain Dealer Bureau Chief, "Unpaid Property Taxes Add up Metro Scofflaws account for third of delinquencies"; The plain Dealer; Oct. 1996.*
PR_Newswire; "Consumer Reports: Patients 'Overdose' on Debt at lenders, doctors, and Hospitals Push Risky Credit to pay for Medical Care"; Jun. 9, 2008.*

* cited by examiner

*Primary Examiner* — Edward Chang
(74) *Attorney, Agent, or Firm* — Flager Schack LLP

(57) ABSTRACT

A transaction process prevents short sales and foreclosures by changing a mortgage loan balance. Once it has been established that a borrowing owner of a home serving as collateral for a mortgage has an impending loan default, a transaction is initiated whereby the borrowing owner conveys a portion of ownership of the home to the lender for a credit amount. The lender agrees to convey the portion of ownership of the home back to the borrowing owner at a later time and the borrowing owner agrees to re-purchase the portion of ownership of the home from the lender at the later time. After the conveyance, the lender credits the credit amount to the borrowing owner in order to achieve decreased periodic payments associated with the mortgage due from the borrowing owner.

1 Claim, 2 Drawing Sheets

(PRESENT INVENTION)

TRANSACTIONS FOR PREVENTING LOAN DEFAULTS, SHORT SALES, AND FORECLOSURES

CROSS REFERENCE TO RELATED APPLICATIONS

This application claims the priority benefit of U.S. Provisional Application No. 61/593,740 on Feb. 1, 2012 which is incorporated herein by reference in its entirety.

BACKGROUND OF THE INVENTION

Millions of homes are worth less than the amount the homeowners owe on their home loan mortgage. In some instances these homeowners are unemployed or have reduced incomes. Any or all of these factors lead to non-payment of loans, default, and finally to loss of the homes by the homeowners via short sales, foreclosures or Deeds-in-lieu of foreclosures. Short sales and foreclosures, in turn, further harm the values of all homes in the areas involved, leading to even more homes being worth less than the mortgage loans. The result is increasing loss of loan principal and interest payments to the lenders in addition to increasing numbers of homeowners losing homes and credit score points.

These reductions in home values reduce the demand for and construction of new homes, which adversely affects the entire economy, along with disruption of people's lives and resulting misery, on top of that already caused by loss of homes and credit score reductions.

SUMMARY OF THE INVENTION

According to an exemplary method, the present invention comprises two transactions. In a first transaction a borrowing homeowner conveys to a lender of a mortgage loan, a recordable Deed of ownership, such as a Grant Deed or Warranty Deed naming lender, current loan servicer or third party as the owner of a sufficient percentage of the home serving as collateral for the mortgage loan, to produce the results that follow: In exchange, the lender or loan servicer credits the borrowing homeowner for the amount of the value of lender's received percentage of the home at the then current market price. This credit is used to pay off any default on the loan and the balance of the credit to be used to pay down the principal balance of the loan so that it no longer exceeds the then current home market value. A loan modification then reduces monthly payments of the borrowing homeowner to an affordable level by the proportionate reduction of monthly principal payment and by an interest rate reduction as needed.

In a second, later transaction, the borrowing owner repurchases, from the lender, the percentage of the home previously conveyed to lender, at the then current market value. The second transaction is performed after a waiting period to provide a chance for lender to recoup more or even all of the original amount of the loan made to borrowing owner, due to increasing home market prices in a recovering economy.

Home values may recover faster during the waiting period due to the fewer defaults, short sales and foreclosures that are likely to occur with the use of the present invention. Borrowing owners are motivated to participate in these transactions to prevent losing their home and credit due to default, and subsequent short sale, foreclosure, or Deed-in-lieu of foreclosure. Lenders are motivated to avoid some or all of loan losses, further harm to other loans due to additional low priced foreclosure sales and short sales, and to avoid the costs of foreclosure and Deed-in-lieu of foreclosure sales.

DETAILED DESCRIPTION OF THE INVENTION

Figure 1:
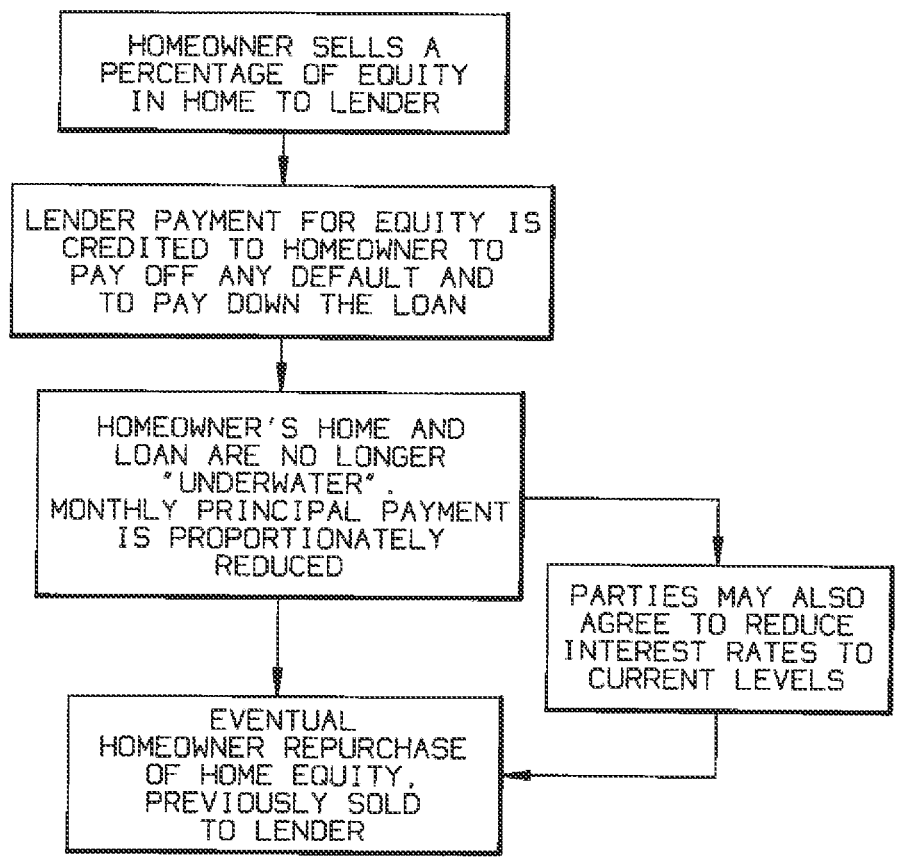
FIG. 1 illustrates a method of preventing mortgage default in accordance with an exemplary embodiment of the present invention.
Figure 2:
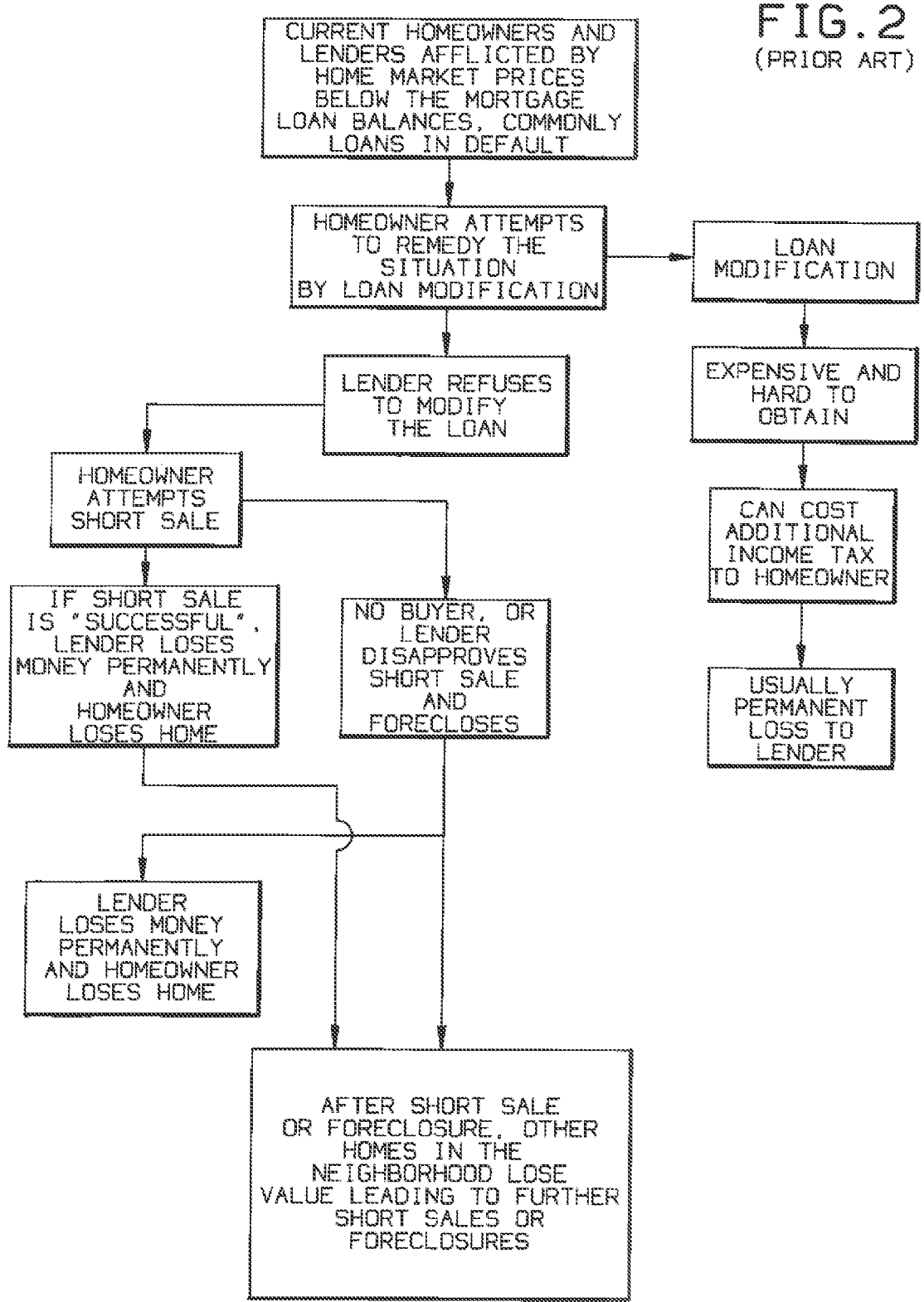
FIG. 2 illustrates a method in accordance with a prior art transaction.

In all steps of the transactions of the present invention, "Lender" and "Loan Owner" and "Loan Holder" are used synonymously, and "Servicer" and "Loan Servicer", also used synonymously, may be the same entity or may be a separate entity representing the current "Loan Holder" or "Loan Owner". Similarly, "Homeowner", "Borrower", "Borrowing Owner", "Borrower/Homeowner" and "Borrowing Homeowner" are used synonymously.

According to an exemplary transaction method in accordance with the present home equity for loan principal and payment reductions invention, a lender or a homeowner initiates contact with the other party either directly or by use of a servicing party assisting with the transaction of the present invention. In some embodiments, the servicing party may be the provider of a website having one or more graphical user interfaces prompting the user for input of information pertaining to a loan, lender and/or borrower. The website may provide one or more contact forms to allow either the lender or the borrower/homeowner to begin the process of the present invention without having to directly contact each other and may also provide a written description of the process. With initial contact, either direct from the beginning, or with computer/Internet assistance, the transaction process of the invention of solving current, or impending, mortgage loan default problems to the advantage of both parties begins.

Exchange of information between the homeowner and lender, including the estimated current market value of the home; the amount currently owed on the first mortgage loan including all unpaid past due payments and late fees (the default amount), if any; the amount of the current monthly payment; and the amount of a monthly payment that homeowner would find affordable currently and for the foreseeable future is accomplished by phone, by letter, by email, by completing a transaction form through a website or by hand or by a combination of these means. Information exchanged may have been stored as data on a memory of a computing device and may be transferred from the memory of one computing device to another through a network of such computing device.

With information exchanged, in a written agreement such as a contract, a homeowner agrees to sell, give, exchange, convey, grant a portion of ownership of the home to the lender or third party. Conveyance of the portion of ownership may be verified, with the use of a Grant Deed, Warranty Deed or other Deed of ownership showing title to a percentage of the property in lender's name, with the remaining percentage of the property in borrower's name. The lender or other third party becomes the owner of the percentage of the home as determined by the home's then current market value. The homeowner continues to own the balance of the home property, provided that no new borrowing homeowner default occurs that requires lender foreclosure or a short sale, or Deed-in-lieu of foreclosure. Records of the agreement may be maintained within a database available for presentation from a memory of a computing device to an output device such as a display.

In exchange, the lender agrees to credit the value of that percentage of the home conveyed by the homeowner, to the homeowner first to pay off any default of borrower and then to use any remaining portion to pay down the principal loan balance.

In a preferred embodiment, the homeowner agrees to convey a sufficient portion of the home ownership, to the lender or third party to accomplish a sufficient pay-down of loan balance such that the loan amount owed is less than or equal to the current market value of the home. Current market value will be as determined by one or more of the lender, homeowner and third party which may establish market value by use of a professional home appraisal.

The result will be a loan modification agreed to by the parties to create a monthly loan payment amount which the parties agree is affordable to homeowner currently and for the foreseeable future based upon information provided in previous steps such as reasonable evidence of the homeowner's income and liabilities. Receipt of equity in the home by lender can be incremental or all at once, with the mortgage loan balance pay-downs also being incremental or all at once. The one or more transactions may be assisted by an escrow, by one or more attorneys, or by one or more companies or individuals.

In some embodiments, the lender and borrowing owner may further agree to a reduction in interest rate, if needed to make the monthly loan payment affordable to borrowing owner. The agreed upon interest rate may be a current prevailing interest rate.

The parties may also agree to other modifications of the mortgage loan, such as term of the loan, prepayment fees if any and interest rate going forward. Such modifications may be established by an algorithm stored as computer readable program code on a memory of a computing device and executed by a processor.

In a preferred embodiment, only homeowner shall have the right of occupancy or to rent the home during all times that homeowner is not in default such as by non-payment of a monthly loan payment or failure of the homeowner to fulfill the agreement to repurchase the portion conveyed to lender or other third party in a timely.

In some embodiments, the lender may convey the percentage of home equity purchased by lender to a third party. This may take place either at the time of the initial sale to lender or at a future date prior to homeowner's repurchase. In such embodiments, the homeowner shall have the right of first refusal regarding such sale, and the homeowner shall retain the right of first refusal regarding any subsequent proposed sale of the home equity to other third party or parties. The ownership and/or title of the lender's acquired percentage of the home will be taken by lender, or other third party, as a "tenant in common", or as otherwise acceptable under local or state law, and acceptable to the parties.

In the same initial written transaction agreement, homeowner/borrower agrees to repurchase the portion of ownership granted to lender, at a later time. The parties may also agree, and the lender may require, that the homeowner repurchase the home equity portion conveyed to lender within an agreed upon time period, such as within five years to ten years, provided that the repurchase for an amount less than the original credit amount does not occur sooner than an agreed-upon waiting period to allow market prices to recover, such as 2, 3, 4 or 5 years. The parties may later agree to extend the time by which homeowner must repurchase in the event home market prices have not yet recovered. This gives homeowner more time before needing to sell the home or refinance it, and provides time for home prices to rise to help lender lose less on the loan when the repurchase is finally made by homeowner.

After a time agreed upon and set forth in the agreement of the first transaction, the homeowner repurchases from the lender or third part, the portion of the home conveyed in the first transaction. The homeowner may perform the repurchase by using the homeowner's cash, by re-financing the home, or by selling the entire home to a third party. Failure by the homeowner to perform the repurchase as specified represents a default on the original mortgage loan as modified by the transaction of the present invention.

The repurchase by the homeowner may be for the same amount originally paid by the lender to the homeowner for the equity in the home. Alternatively, the repurchase may be a smaller amount in the event the market value of the home is lower at the time of repurchase or can be a larger amount in the event the market value of home has increased as of the time of repurchase. A proof of ownership, in the form of a Grant Deed, Warranty Deed or other recordable Deed of ownership shall be received by the homeowner upon repurchase from the lender or third party.

In some embodiments, if the homeowner has waited for the required period, the home sells for no more than the amount needed to pay off the mortgage loan balance and the sale is for an amount not lower than the amount of current home market value, the homeowner may not be required to pay more than $1 (one dollar) to Lender or subsequent third party owner of the equity portion, for the repurchase required in order to sell the entire home.

If property values rise, the home may become worth more than the remaining mortgage balance, and may provide a profit upon the sale of the home for homeowner. In some embodiments, the lender may also profit from this sale as set forth in the original agreement documentation.

If property values fall, the lender may agree to a short sale such as is currently done. In the event that the home market sale price does not provide sufficient cash for both the equity repurchase from the lender and for the mortgage loan balance payoff, the shortfall may be taken as a repurchase loss by the lender or successor equity owner. The lender may agree to guarantee or insure any or all of the loss that would otherwise be taken by a successor third party purchaser of the home equity portion, in case of a shortfall at the time of eventual sale of the entire home or other repurchase by the homeowner.

In some embodiments, the homeowner may sell the retained share of the home to a third party during the time prior to repurchase.

According to a numerical example of the method of the present invention, if a home is currently worth $400,000, the original loan amount is $500,000, and the current loan balance including all unpaid amounts and late fees is $500,000, and provided homeowner can afford monthly payments on a loan of $400,000, then the purchase price, or credit to homeowner, for the home equity will be $100,000. As such, the lender or other third party, credits $100,000 to the homeowner, and lender immediately, or incrementally as otherwise agreed, uses that credit to reduce the homeowner's balance on the mortgage loan to $400,000.

In this example, the lender or other third party is acquiring 25% ownership of the home, since the $100,000 credited for the purchase is equal to 25% of the home's current market value.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed is:

1. A method for reducing the risk of property owners losing their properties due to financial difficulties, the method serving to improve upon the stabilization of housing property markets by its implementation, the method being applicable to at least those entities that extend credit to property owners in the form of a loan, such as lenders who provide mortgages to property owners, and insurers who underwrite such mortgages on properties, where for purposes of the method, a property owner is in the position of a mortgagor and a lender is in the position of a mortgagee, the method comprising:

providing a software application configured to be uploaded to a computer, the application configured to monitor the real-time economics associated with a particular mortgage as applied to a particular property, the application configured to interface with a database configured to store digital information regarding certain attributes of the mortgage that may include one or more of the following items: the identity of the mortgaged property, the identity of the mortgagor, the identity of the mortgagee, the amount of the mortgage, the payment structure for the mortgage, including monthly payments and the number of expected payments to payoff the mortgage, the current market value of the mortgaged property, comparative property values, and market information reflective of current micro- and/or macro-market conditions;

opening a graphic user interface provided by the software application configuration to permit a user to input information to populate the database with the attributes of the mortgage at issue, including permitting the user to periodically update such information as needed or desired;

updating the database with current property market conditions, including one or more of the following items: the current value of the property mortgaged, the monthly payment that the property owner could afford to make or is willing to make under the current economic circumstances; and permitting the software to determine in real time whether the market value of the property upon which the mortgage is held has decreased to an amount less than the amount owed on the mortgage, whereby the outcome of the determination causes a further determination of whether the present payment structure on the mortgage can remain in its current state or whether action must be taken to reconfigure the payment structure to address the decreased value without forcing a foreclosure of the home, and permitting the software to determine the percentage ownership of the property at its current value that should be transferred by the mortgagor to the mortgagee to justify reconfiguring the payment structure rather than foreclosing on the home, including one or more of the following items: the monthly payment that the property owner could afford to make or is willing to make under the current economic circumstances, the current market value of the property, and the amount of the current default on the existing loan, if any;

permitting the software to determine a cost-beneficial set of buyback terms that maximizes the opportunity for both the property owner mortgagor to recover financially and the lender mortgagee to realize the expedited return on the investment reflected by the initial terms of the mortgage, or make money if property values rise sufficiently prior to property owner's buyback, the buyback terms including at least one or more of the following items: the dollar amount of the buyback by the mortgagor to the mortgagee, and the amount of time by which time the buyback should begin or should be concluded.

* * * * *